US012307870B2

(12) United States Patent
Kato et al.

(10) Patent No.: US 12,307,870 B2
(45) Date of Patent: May 20, 2025

(54) USER DEVICE, SAFETY EDUCATION SYSTEM, CONTROL METHOD, AND NON-TRANSITORY RECORDING MEDIUM IN WHICH CONTROL PROGRAM IS RECORDED

(71) Applicant: TOYOTA JIDOSHA KABUSHIKI KAISHA, Toyota (JP)

(72) Inventors: Takahiro Kato, Numazu (JP); Takashi Kashimura, Nagoya (JP); Yuta Ochiai, Chiyoda-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

(21) Appl. No.: 18/212,219

(22) Filed: Jun. 21, 2023

(65) Prior Publication Data

US 2024/0005761 A1 Jan. 4, 2024

(30) Foreign Application Priority Data

Jul. 4, 2022 (JP) ................................ 2022-107815

(51) Int. Cl.
*G08B 21/02* (2006.01)

(52) U.S. Cl.
CPC ................................ *G08B 21/0225* (2013.01)

(58) Field of Classification Search
CPC ............ G08B 21/0225; G08B 21/0291; G08B 21/0269; G06Q 10/063; G06Q 50/265
See application file for complete search history.

(56) References Cited

U.S. PATENT DOCUMENTS

| | | | | |
|---|---|---|---|---|
| 2019/0186935 | A1* | 6/2019 | Carter | G01C 21/3679 |
| 2020/0359175 | A1* | 11/2020 | Schobel | G08B 21/0255 |

FOREIGN PATENT DOCUMENTS

| | | | |
|---|---|---|---|
| JP | 2019-204301 | A | 11/2019 |
| WO | 2019/240062 | A1 | 12/2019 |
| WO | 2019/240065 | A1 | 12/2019 |
| WO | 2019/240070 | A1 | 12/2019 |

* cited by examiner

*Primary Examiner* — Daryl C Pope
(74) *Attorney, Agent, or Firm* — Dinsmore & Shohl LLP

(57) ABSTRACT

A user device, including a first processor, the first processor being configured to: acquire a current position of a user and, in a case in which the user has deviated from a set route or a set area, control whether or not to cause a notification unit to implement a notification to return to the set route or the set area based on ranking information representing a ranking of concern with respect to safety of the user.

10 Claims, 7 Drawing Sheets

| | USER AGE | | | | |
|---|---|---|---|---|---|
| | YOUNGER THAN 6 | 6 AND OLDER BUT YOUNGER THAN 8 | 8 AND OLDER BUT YOUNGER THAN 10 | 10 AND OLDER BUT YOUNGER THAN 12 | 12 AND OLDER |
| CRITERION Rth | 3 | 5 | 10 | 20 | 30 |

USER DEVICE, SAFETY EDUCATION SYSTEM, CONTROL METHOD, AND NON-TRANSITORY RECORDING MEDIUM IN WHICH CONTROL PROGRAM IS RECORDED

CROSS-REFERENCE TO RELATED APPLICATION

This application is based on and claims priority under 35 USC 119 from Japanese Patent Application No. 2022-107815, filed on Jul. 4, 2022, the disclosure of which is incorporated by reference herein.

BACKGROUND

Technical Field

The present disclosure relates to a user device, a safety education system, a control method, and a non-transitory recording medium in which a control program is recorded.

Related Art

Japanese Patent Application Laid-open (JP-A) No. 2019-204301 discloses a monitoring system that judges that a route is aberrant in a case in which a distance of deviation of a subject terminal from a set route is equal to or higher than a preset threshold value and there is no other subject terminal in the vicinity, and notifies a monitoring person who monitors a subject carrying the subject terminal.

The monitoring system disclosed in JP-A No. 2019-204301 has the problem that the monitoring person is not notified in a case in which the person who owns the subject terminal is in the vicinity of the subject even when the subject is deviating from the set route or a set area and is heading toward a place where concern with respect to safety are relatively high (e.g., an intersection).

SUMMARY

The present disclosure has been devised in consideration of the above circumstances, and it is an object thereof to provide a user device, a safety education system, a control method, and a control program which, in a case in which a user has deviated from a set route or a set area, can control whether or not to implement a notification to return to the set route or the set area in consideration of concern with respect to safety of the user.

A user device of a first aspect comprises: an acquisition section that acquires a current position of a user; and a control section which, in a case in which the user has deviated from a set route or a set area, controls whether or not to cause a notification unit to implement a notification to return to the set route or the set area based on ranking information representing a ranking of concern with respect to safety of the user.

The set route is a route set for the user to follow beforehand. Furthermore, the set area is an area set for the user to follow beforehand. For example, the set route is a school route between the user's home and school or a school route between the user's home and a facility where the user learns sports and receives private tutoring lessons, and the set area is an area on the school route. In the user device of the first aspect, the acquisition section acquires the current position of the user, and the control section, in a case in which the user has deviated from the set route or the set area, controls whether or not to cause the notification unit to implement the notification to return to the set route or the set area based on the ranking information representing a ranking of concern with respect to the safety of the user. According to the user device of the first aspect, in a case in which the user has deviated from the set route or the set area, whether or not to implement the notification to return to the set route or the set area can be controlled in consideration of concern with respect to safety of the user.

A user device of a second aspect is the user device of the first aspect, wherein the control section causes the notification unit to implement the notification in a case in which the ranking represented by the ranking information is equal to or higher than a predetermined criterion and does not cause the notification unit to implement the notification in a case in which the ranking represented by the ranking information is lower than the predetermined criterion. According to the user device of the second aspect, the user can be inhibited from heading to a place where concern with respect to safety are relatively high.

A user device of a third aspect is the user device of the second aspect, wherein the control section sets the predetermined criterion based on an age of the user. According to the user device of the third aspect, the safety of the user can be better ensured compared with a case where an age of the user is not considered.

A user device of a fourth aspect is the user device of the third aspect, wherein the control section sets the predetermined criterion lower, the lower the age is, and sets the predetermined criterion higher, the higher the age is. According to the user device of the fourth aspect, the safety of a user of a relatively young age can be better ensured.

A user device of a fifth aspect is the user device of any one of the first to fourth aspects, wherein the control section notifies a supervisor of the user that the user has deviated from the set route or the set area in a case in which the ranking represented by the ranking information is equal to or higher than a predetermined criterion and does not notify the supervisor of the user that the user has deviated from the set route or the set area in a case in which the ranking represented by the ranking information is lower than the predetermined criterion. According to the user device of the fifth aspect, the supervisor of the user can grasp that the user has deviated from the set route or the set area in a case in which the user is heading to a place where concern with respect to safety are relatively high.

A safety education system of a sixth aspect comprises the user device of any one of the first to fifth aspects and a server, the server including a generation section that generates ranking information representing a ranking of concern with respect to the safety of the user carrying the user device and a transmission section that sends the ranking information generated by the generation section to the user device. According to the safety education system of the sixth aspect, whether or not to implement the notification to return to the set route or the set area can be controlled based on the ranking information generated by the server.

A control method of a seventh aspect is a control method according to which a computer executes processing comprising: acquiring a current position of a user and, in a case in which the user has deviated from a set route or a set area, controlling whether or not to cause a notification unit to implement a notification to return to the set route or the set area based on ranking information representing a ranking of concern with respect to safety of the user. According to the control method of the seventh aspect, in a case in which the user has deviated from the set route or the set area, whether or not to implement the notification to return to the set route or the set area can be controlled in consideration of concern with respect to safety of the user.

A control program of an eighth aspect causes a computer to perform a processing comprising: acquiring a current position of a user, and, in a case in which the user has deviated from a set route or a set area, controlling whether or not to cause a notification unit to implement a notification to return to the set route or the set area based on ranking information representing a ranking of concern with respect to the safety of the user. According to the control program of the eighth aspect, in a case in which the user has deviated from the set route or the set area, whether or not to implement the notification to return to the set route or the set area can be controlled in consideration of concern with respect to the safety of the user.

According to the present disclosure, in a case in which a user has deviated from a set route or a set area, whether or not to implement a notification to return to the set route or the set area can be controlled in consideration of concern with respect to the safety of the user.

BRIEF DESCRIPTION OF THE DRAWINGS

An exemplary embodiment of the present disclosure will be described in detail based on the following figures, wherein.

DETAILED DESCRIPTION

Figure 1:
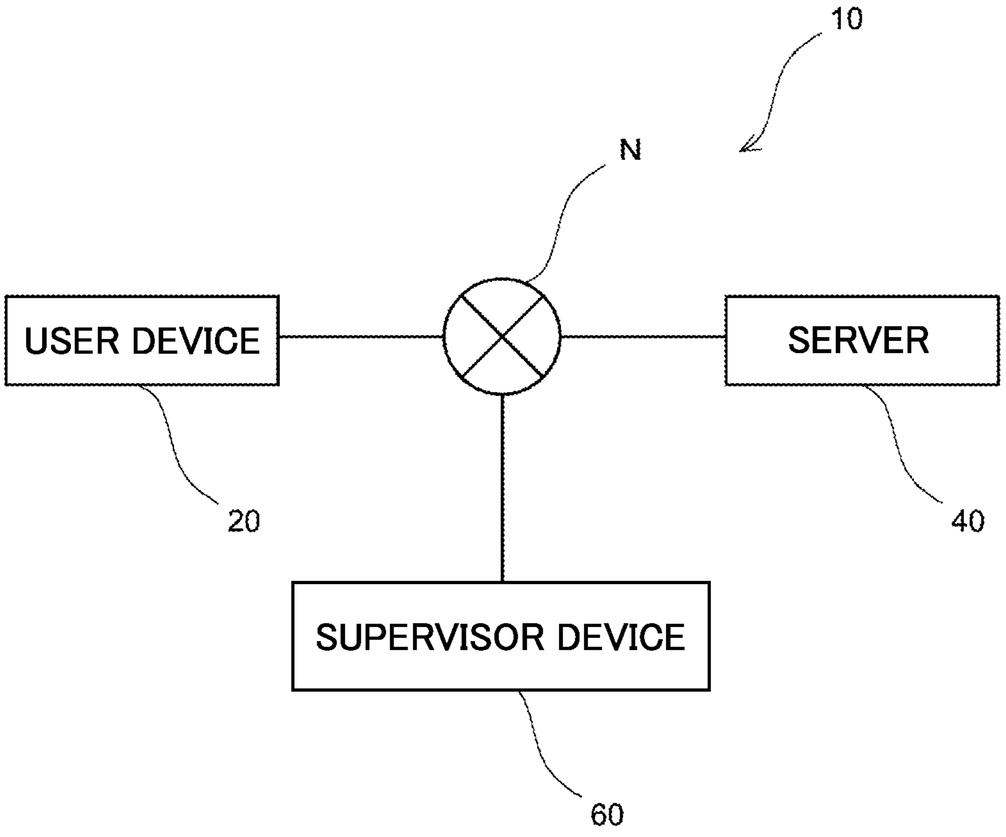
FIG. 1 is a diagram showing the schematic configuration of a safety education system pertaining to the embodiment.

FIG. 1 is a diagram showing the schematic configuration of a safety education system 10.

As shown in FIG. 1, the safety education system 10 includes a user device 20, a server 40, and a supervisor device 60. The user device 20, the server 40, and the supervisor device are connected via a network N and are communicable with each other.

The user device 20 is a device carried by a user. In this embodiment, the user is a lower elementary school child. Furthermore, as an example, the user device 20 is attached to the shoulder strap of a school backpack the user carries on his/her back. The user device 20 is an example of an information processing device.

The server 40 is a server computer owned by a predetermined business operator.

The supervisor device 60 is a device owned by a parent who is a supervisor of the user. As an example, an all-purpose computer device such as a personal computer (PC) or a portable device such as a notebook PC, smartphone, or tablet computer can be applied to the supervisor device 60. In this embodiment, as an example, the supervisor device 60 is a smartphone.

Figure 2:
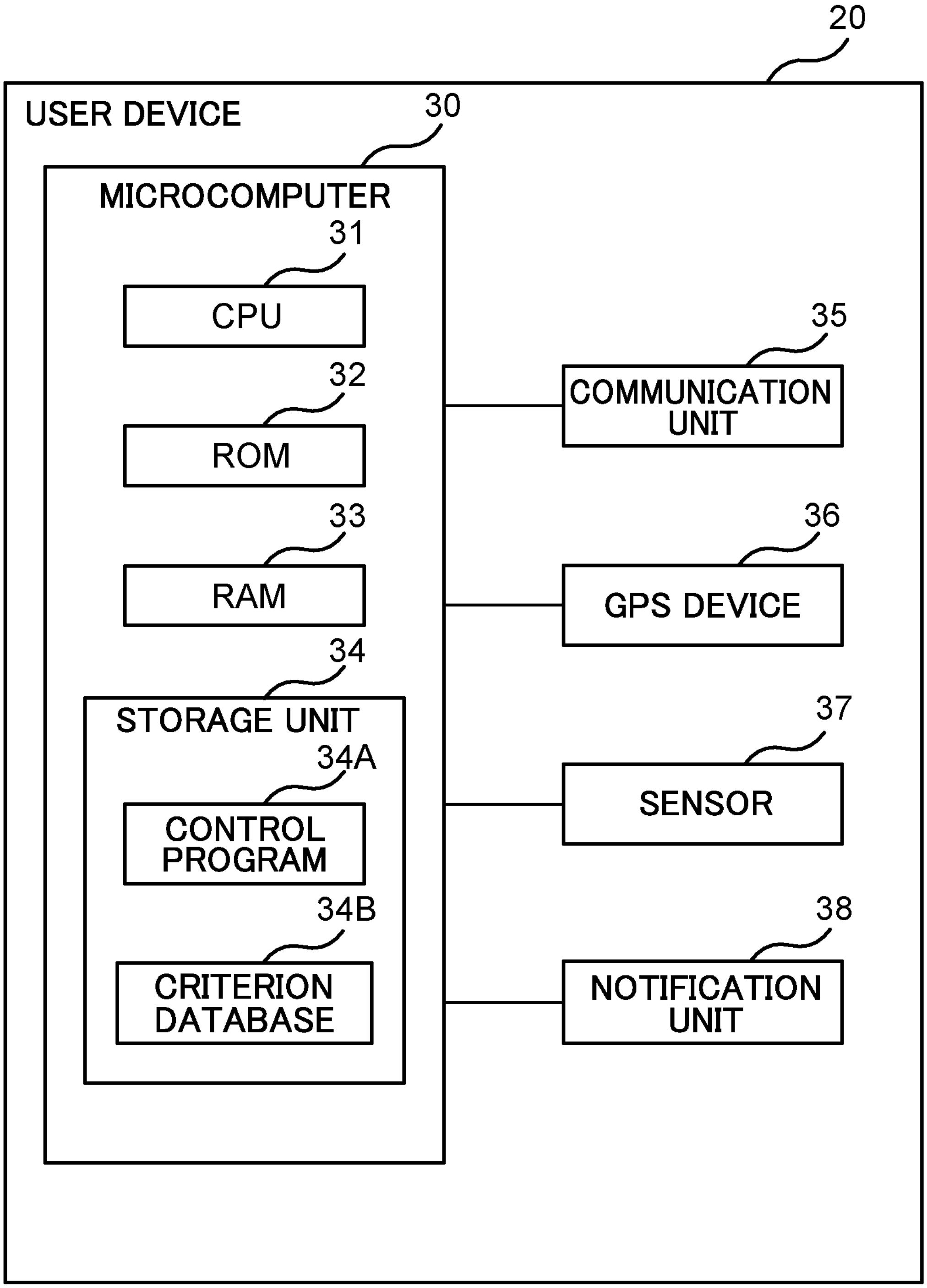
FIG. 2 is a block diagram showing hardware configurations of a user device pertaining to the embodiment.

Next, hardware configurations of the user device 20 will be described. FIG. 2 is a block diagram showing the hardware configurations of the user device 20.

As shown in FIG. 2, the user device 20 includes a microcomputer 30, a communication unit 35, a GPS device 36, a sensor 37, and a notification unit 38.

The microcomputer 30 is configured to comprise a central processing unit (CPU) 31, a read-only memory (ROM) 32, a random-access memory (RAM) 33, and a storage unit 34. The CPU 31 is an example of a first processor.

The CPU 31 is a central processing unit, executes various types of programs, and controls each part of the user device 20. That is, the CPU 31 reads programs from the ROM 32 or the storage unit 34 and executes the programs using the RAM 33 as a workspace. The CPU 31 controls each of the above configurations and performs various types of arithmetic processing in accordance with the programs recorded in the ROM 32 or the storage unit 34.

The ROM 32 stores various types of programs and various types of data. The RAM 33 temporarily stores programs or data as a workspace.

The storage unit 34 is configured by a storage device such as an embedded multimedia card (eMMC) or universal flash storage (UFS) and stores various types of programs and various types of data. As an example of the various types of programs, the storage unit 34 stores a control program 34A executable by the CPU 31 to perform a control process described later. As an example of the various types of data, the storage unit 34 stores risk ranking information sent from the server 40 and representing a risk ranking of concern with respect to safety of the user in each range on a school route. The concern with respect to the safety of the user are, as an example, traffic accidents, sightings of suspicious persons, and natural disasters, and include both incidents and accidents. The risk ranking information will be described in detail later. It will be noted that the risk ranking is an example of ranking and the risk ranking information is an example of ranking information.

Furthermore, the storage unit 34 stores a set route and a set area that have been set for the user to follow beforehand. For example, the set route is a school route between the user's home and school or a school route between the user's home and a facility where the user learns sports and receives private tutoring lessons, and the set area is an area on the school route. Furthermore, the storage unit 34 stores map information. It will be noted that the user device 20 may also be configured to acquire map information from an external device via the network N.

Furthermore, the storage unit 34 stores a criterion database 34B.

Figures 3, 4:
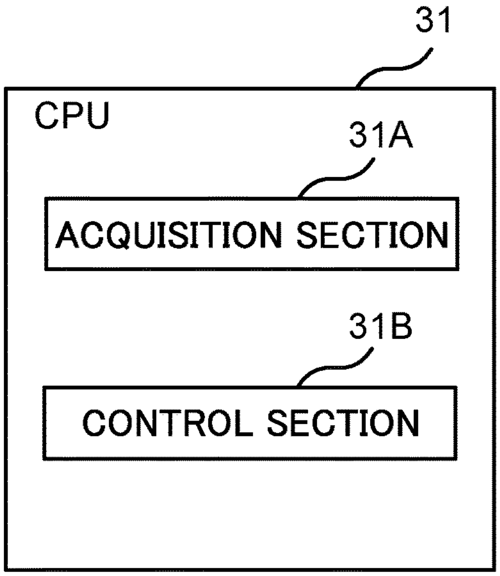
FIG. 3 is a drawing showing an example of the configuration of a criterion database pertaining to the embodiment.
FIG. 4 is a block diagram showing an example of functional configurations of the user device pertaining to the embodiment.

FIG. 3 is a schematic drawing showing an example of the configuration of the criterion database 34B.

As shown in FIG. 3, in the criterion database 34B, criterions Rth are associated and stored by user ages grouped in certain ranges. As shown in FIG. 3, the lower the user age is, the lower is the value stored as the criterion Rth, and the higher the user age is, the higher is the value stored as the criterion Rth.

The communication unit 35 is a wireless communication module for communicating with the server 40 and the supervisor device 60. The wireless communication module uses a communication protocol such as, for example, 5G, LTE, or Wi-Fi (registered trademark). The communication unit 35 is connected to the network N.

The GPS device 36 is a device that determines the current position of the user. The GPS device 36 includes an antenna (not shown in the drawings) that receives signals from GPS satellites. The current position of the user determined by the GPS device 36 is linked to a determination date and time when the current position was determined, is stored in the storage unit 34, and is sent to the server 40.

The sensor 37 is a motion sensor including an angular velocity sensor, an acceleration sensor, and a geomagnetic sensor. As an example, the sensor 37 uses an angular velocity sensor to measure angular velocity resulting from the motion of the user device 20. The angular velocity measured by the sensor 37 is stored in the storage unit 34.

The notification unit 38 is a device that implements plural notifications for the user moving on the school route to return to the set route or the set area. As an example, the notification unit 38 implements the notifications using vibration and audio. Furthermore, there are plural types of vibration and audio notification patterns implemented by the notification unit 38, and the notification unit 38 implements the notifications using a notification pattern according to an instruction from the CPU 31. In the safety education system 10, due to the notification unit 38 implementing the notifications, the user moving on the school route can be made aware that he/she needs to return to the set route or the set area.

Next, functional configurations of the user device 20 will be described. FIG. 4 is a block diagram showing an example of the functional configurations of the user device 20.

In the user device 20 of this embodiment, the CPU 31 functions as an acquisition section 31A and a control section 31B shown in FIG. 4 by executing the control program 34A.

As shown in FIG. 4, the CPU 31 of the user device 20 has, as functional configurations, the acquisition section 31A and the control section 31B. Each of these functional configurations is realized as a result of the CPU 31 reading and executing the control program 34A stored in the storage unit 34.

The acquisition section 31A acquires the current position of the user determined by the GPS device 36. Furthermore, the acquisition section 31A acquires from the server 40 risk ranking information representing a risk ranking regarding one or plural ranges including the range closest to the range in the vicinity of the current position of the user.

The control section 31B, in a case in which the user has deviated from the set route or the set area, controls whether or not to cause the notification unit 38 to implement a notification to return to the set route or the set area (hereinafter called a "return notification") based on the risk ranking information. The control section 31B determines whether the user has deviated from the set route or the set area based on the current position of the user and the map information. In this embodiment, the control section 31B causes the notification unit 38 to implement the return notification in a case in which the risk ranking is equal to or higher than the criterion Rth which is a predetermined criterion. On the other hand, the control section 31B does not cause the notification unit 38 to implement the return notification in a case in which the risk ranking is lower than the criterion Rth. However, the control section 31B is not limited to this example. The control section 31B may also be configured to not cause the notification unit 38 to implement the return notification in a case in which the risk ranking is equal to or higher than the criterion Rth and cause the notification unit 38 to implement the return notification in a case in which the risk ranking is lower than the criterion Rth.

Furthermore, in a case in which the risk ranking is equal to or higher than the criterion Rth, the control section 31B notifies the supervisor device 60 that the user has deviated from the set route or the set area. On the other hand, in a case in which the risk ranking is lower than the criterion Rth, the control section 31B does not notify the supervisor device 60 that the user has deviated from the set route or the set area.

The control section 31B notifies the supervisor device 60 that the user has deviated from the set route or the set area in a case in which the user and the supervisor are not together but need not notify the supervisor device 60 that the user has deviated from the set route or the set area in a case in which the user and the supervisor are together. Furthermore, in a case in which another user, other than the user, is carrying the user device 20 and is, rather than the supervisor, together with the user, the control section 31B need not notify the supervisor device 60 that the user has deviated from the set route or the set area. Furthermore, the control section 31B may also notify the supervisor device 60 that the user has deviated from the set route or the set area in a case in which the user has not returned to the set route or the set area even after a predetermined amount of time has elapsed after the control section 31B has caused the notification unit 38 to implement the return notification. Additionally, the control section 31B need not notify the supervisor device 60 that the user has deviated from the set route or the set area in a case in which the user has returned to the set route or the set area after the predetermined amount of time has elapsed after the control section 31B has caused the notification unit 38 to implement the return notification.

Furthermore, in this embodiment, the control section 31B sets the criterion Rth based on the user's age. Specifically, the control section 31B reads the criterion database 34B and sets the criterion Rth based on the user's age. The lower the age of the user is, the lower is the value stored as the criterion Rth in the criterion database 34B, and the higher the age of the user is, the higher is the value stored as the criterion Rth in the criterion database 34B. Consequently, the control section 31B sets the criterion Rth lower, the lower the age of the user is, and sets the criterion Rth higher, the higher the age of the user is. However, the control section 31B is not limited to this example. For example, in a case in which the user is an elderly person, the control section 31B may set the criterion Rth lower, the higher the age of the user is, and set the criterion Rth higher, the lower the age of the user is.

Furthermore, the control section 31B may set the criterion Rth based on the number of times it has caused the notification unit 38 to implement the return notification in the past. Specifically, the control section 31B may set the criterion Rth lower, the greater the number of times it has caused the notification unit 38 to implement the return notification in the past is, and set the criterion Rth higher, the lower the number of times it has caused the notification unit 38 to implement the return notification in the past is.

Furthermore, the control section 31B sends various types of data stored in the storage unit 34 to the server 40 via the communication unit 35. As an example of the various types of data, the control section 31B sends to the server 40 the current position of the user, the determination date and time of the current position, and implementation results of safety actions by the user in the ranges on the school route promoting safety actions.

Figure 5:
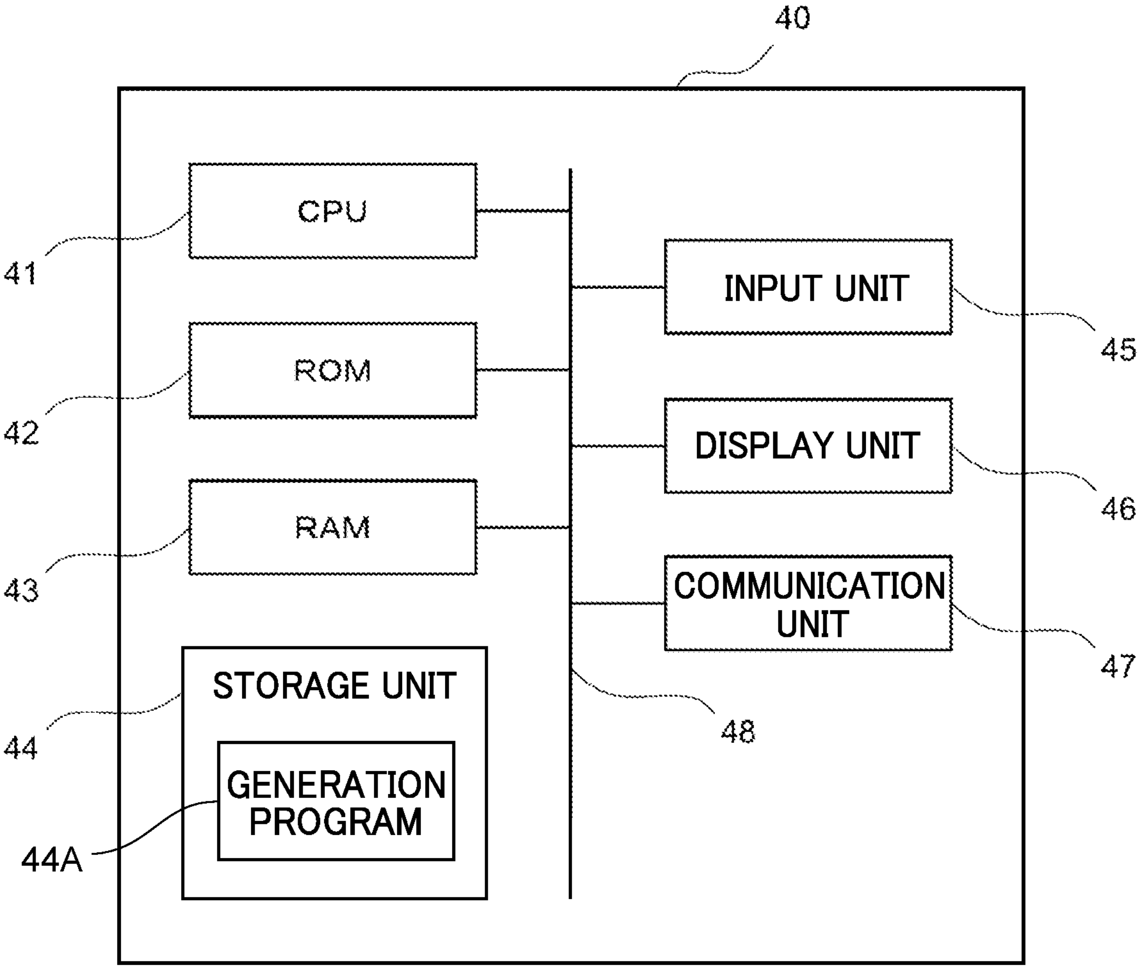
FIG. 5 is a block diagram showing hardware configurations of a server pertaining to the embodiment.

Next, hardware configurations of the server 40 will be described. FIG. 5 is a block diagram showing the hardware configurations of the server 40.

As shown in FIG. 5, the server 40 comprises a CPU 41, a ROM 42, a RAM 43, a storage unit 44, an input unit 45, a display unit 46, and a communication unit 47. These configurations are communicably connected to each other via a bus 48. The CPU 41 is an example of a second processor.

The CPU 41 is a central processing unit, executes various types of programs, and controls each part of the server 40. That is, the CPU 41 reads programs from the ROM 42 or the storage unit 44 and executes the programs using the RAM 43 as a workspace. The CPU 41 controls each of the above configurations and performs various types of arithmetic processing in accordance with the programs recorded in the ROM 42 or the storage unit 44.

The ROM 42 stores various types of programs and various types of data. The RAM 43 temporarily stores programs or data as a workspace.

The storage unit 44 is configured by a storage device such as a hard disk drive (HDD), a solid-state drive (SSD), or flash memory and stores various types of programs and various types of data. As an example of the various types of programs, the storage unit 44 stores a generation program 44A for causing the CPU 41 to execute a generation process described later. As an example of the various types of data, the storage unit 44 stores the user's age, the times when the user goes to and leaves school, and the user's school days, which are sent from the user device 20 or the supervisor device 60.

The input unit 45 includes a pointing device such as a mouse, a keyboard, a microphone, and a camera and is used to perform various types of input.

The display unit 46 is, for example, a liquid crystal display and displays various types of information. The display unit 46 employs a touch panel system and may also function as the input unit 45.

The communication unit 47 is an interface for communicating with the user device 20 and the supervisor device 60. For the communication, for example, a wired communication protocol, such as Ethernet (registered trademark) or FDDI, or a wireless communication protocol, such as 4G, 5G, Bluetooth (registered trademark), or Wi-Fi (registered trademark), is used. The communication unit 47 is connected to the network N.

Figure 6:
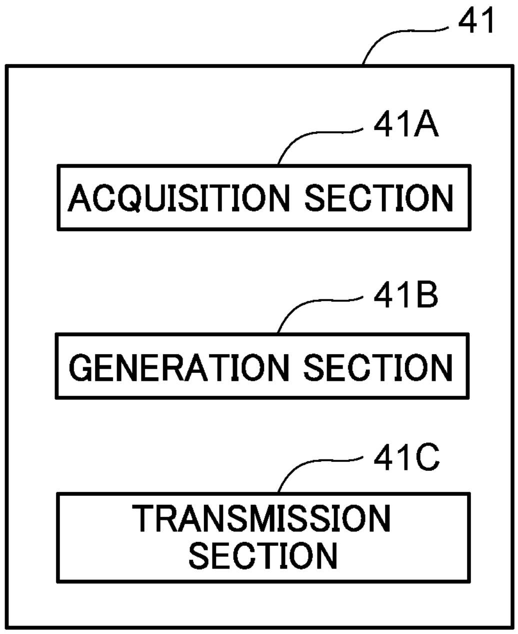
FIG. 6 is a block diagram showing an example of functional configurations of the server pertaining to the embodiment.

Next, functional configurations of the server 40 will be described. FIG. 6 is a block diagram showing an example of the functional configurations of the server 40.

As shown in FIG. 6, the CPU 41 of the server 40 has, as functional configurations, an acquisition section 41A, a generation section 41B, and a transmission section 41C. Each of these functional configurations is realized as a result of the CPU 41 reading and executing the generation program 44A stored in the storage unit 44.

The acquisition section 41A acquires the current position of the user, the determination date and time of the current position, and implementation results of safety actions by the user in the ranges on the school route promoting safety actions. The acquisition section 41A stores in the storage unit 44 the current position of the user, the determination date and time of the current position, and implementation results of safety actions by the user in the ranges on the school route promoting safety actions that it has acquired.

Furthermore, the acquisition section 41A periodically acquires from an external device (not shown in the drawings), as concern in the ranges on the school route promoting safety actions, risk information including the frequencies of occurrence of the concern, the times of occurrence of the concern, the weather conditions when the concern occurred, the ages of victims of an incident of concern, and the suffering incurred by victims of an incident of concern in each range. The acquisition section 41A stores in the storage unit 44 the risk information it has acquired.

The generation section 41B generates risk ranking information based on the risk information acquired by the acquisition section 41A. As an example, the generation section 41B calculates an individual assessment value for each concern in the ranges on the school route promoting safety actions, adds up the individual assessment values for each concern it has calculated, and generates risk ranking information representing risk ranking in the ranges.

Here, the generation section 41B performs weighting so that, in a case in which the difference between the ages of victims of an incident of concern and an age of the user is less than a predetermined value, the risk ranking represented by the risk ranking information becomes higher. As an example, in a case in which the difference between the age of a victim of an incident of concern (e.g., a traffic accident) acquired as the risk information and the age of the user stored in the storage unit 44 is less than a predetermined value such as 3, the generation section 41B multiples the individual assessment value for that concern by 1.1.

Furthermore, the generation section 41B performs weighting so that, in a case in which the times of occurrence of the concern overlap the preset times when the user goes to and leaves school, the risk ranking represented by the risk ranking information becomes higher. As an example, in a case in which the time of occurrence of a concern (e.g., a traffic accident) acquired as the risk information overlaps the times when the user goes to and leaves school stored in the storage unit 44, the generation section 41B multiplies the individual assessment value for that concern by 1.1.

Furthermore, the generation section 41B performs weighting so that, in a case in which the weather conditions when the concern occurred have a commonality with the weather conditions on the school days of the user, the risk ranking represented by the risk ranking information becomes higher. As an example, in a case in which the weather conditions when a concern (e.g., a traffic accident) occurred in the past acquired as the risk information have rain in common with the weather conditions on the school days of the user stored in the storage unit 44, the generation section 41B multiplies the individual assessment value for that concern by 1.1. The school days of the user are an example of days on which the user moves on a route.

Furthermore, the generation section 41B performs weighting so that, in a case in which the suffering incurred by the victims of an incident of concern is bad, the risk ranking represented by the risk ranking information becomes higher. As an example, in a case in which the suffering incurred by the victim of a traffic accident is severe or fatal, the generation section 41B determines that the suffering incurred by the victim is bad. Additionally, in a case in which the suffering in a concern (e.g., a traffic accident) acquired as the risk information is bad, the generation section 41B multiples the individual assessment value for that concern by 1.1.

Furthermore, the generation section 41B uses the current position of the user, the determination date and time of the current position, and the implementation results of safety actions by the user in the ranges on the school route promoting safety actions stored in the storage unit 44 to generate a moving path for the user based on the implementation results of safety actions. The generation section 41B stores in the storage unit 44 the moving path for the user it has generated.

The transmission section 41C sends the risk ranking information generated by the generation section 41B to the user device 20. Furthermore, the transmission section 41C periodically sends to the supervisor device 60 the moving path of the user based on the implementation results of safety actions in the ranges on the school route stored in the storage unit 44.

Figure 7:
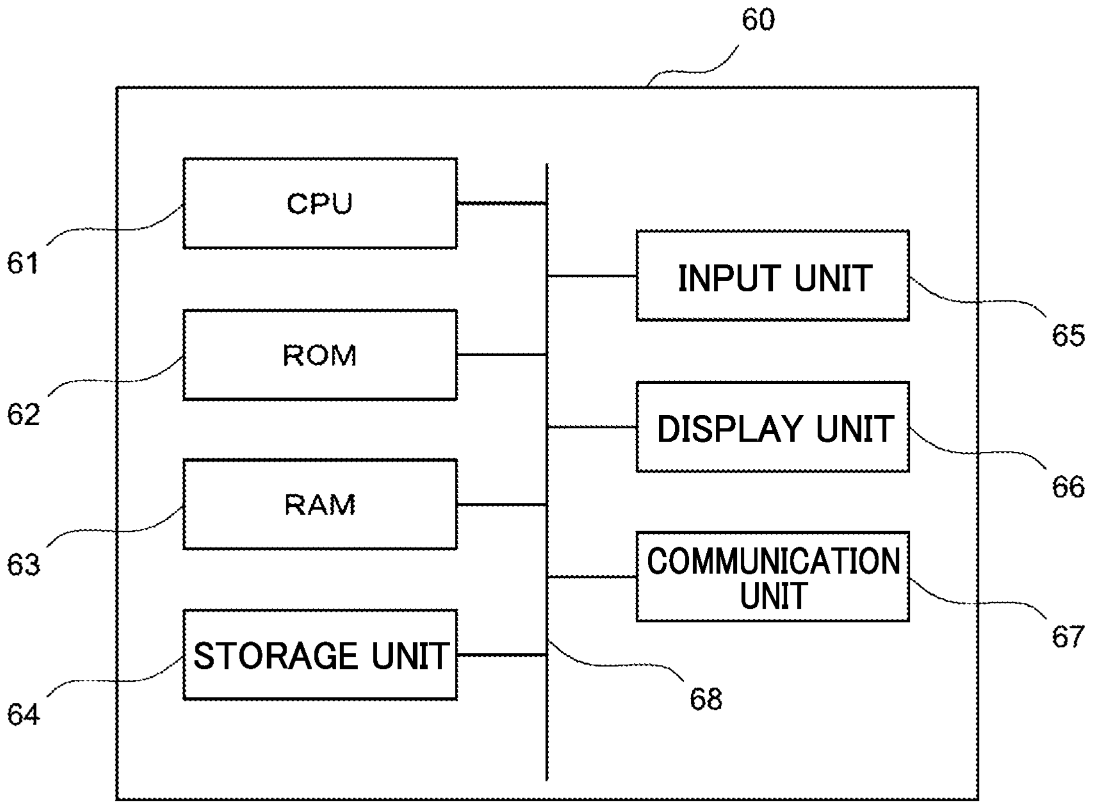
FIG. 7 is a block diagram showing hardware configurations of a supervisor device pertaining to the embodiment.

Next, hardware configurations of the supervisor device 60 will be described. FIG. 7 is a block diagram showing the hardware configurations of the supervisor device 60.

As shown in FIG. 7, the supervisor device 60 comprises a CPU 61, a ROM 62, a RAM 63, a storage unit 64, an input unit 65, a display unit 66, and a communication unit 67. These configurations are communicably connected to each other via a bus 68.

The CPU 61 is a central processing unit, executes various types of programs, and controls each part of the supervisor device 60. That is, the CPU 61 reads programs from the ROM 62 or the storage unit 64 and executes the programs using the RAM 63 as a workspace. The CPU 61 controls each of the above configurations and performs various types of arithmetic processing in accordance with the programs recorded in the ROM 62 or the storage unit 64.

The ROM 62 stores various types of programs and various types of data. The RAM 63 temporarily stores programs or data as a workspace.

The storage unit 64 is configured by a storage device such as an eMMC or a UFS and stores various types of programs and various types of data.

The input unit 65 includes various types of buttons, a microphone, and a camera and is used to perform various types of input.

The display unit 66 is, for example, a liquid crystal display and displays various types of information. The display unit 66 employs a touch panel system and also functions as the input unit 65.

The communication unit 67 is a wireless communication module for communicating with the user device 20 and the server 40. The wireless communication module uses a communication protocol such as, for example, 5G, LTE, or Wi-Fi (registered trademark). The communication unit 67 is connected to the network N.

Here, the CPU 61 of the supervisor device 60 requests from the server 40 the moving path of the user on the school route. Additionally, the CPU 61 causes the display unit 66 to display the moving path of the user based on the implementation results of safety actions in the ranges on the school route it has acquired.

Figure 8:
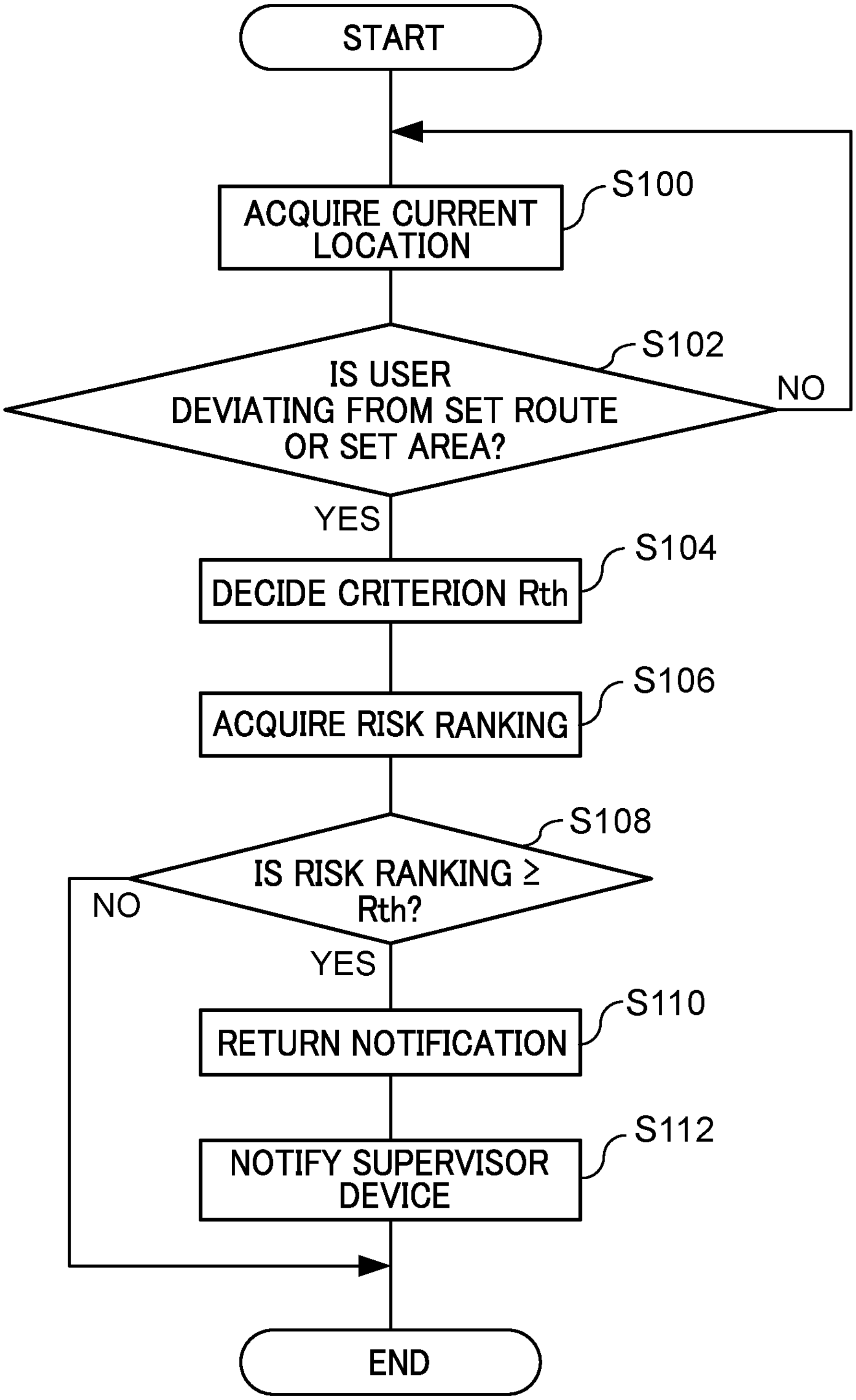
FIG. 8 is a flowchart showing the flow of a control process pertaining to the embodiment.

Next, the flow of a process executed by the user device 20 will be described. FIG. 8 is a flowchart showing the flow of a control process executed by the user device 20. The control process is performed as a result of the CPU 31 reading the control program 34A from the storage unit 34, loading it to the RAM 33, and executing it.

In step S100 shown in FIG. 8, the CPU 31 acquires the current position of the user determined by the GPS device 36. Then, the CPU 31 proceeds to step S102.

In step S102, the CPU 31 determines whether or not the user is deviating from the set route or the set area. Specifically, the CPU 31 determines whether or not the user is deviating from the set route or the set area based on the current position of the user it has acquired and the map information. The CPU 31 proceeds to step S104 in a case in which the user is deviating from the set route or the set area (step S102: YES). On the other hand, the CPU 31 returns to step S100 in a case in which the user is not deviating from the set route or the set area (step S102: NO).

In step S104, the CPU 31 decides the criterion Rth. Specifically, the CPU 31 decides, as the criterion Rth, the criterion Rth stored in association with the user's age in the criterion database 34B.

In step S106, the CPU 31 acquires from the server 40 the risk ranking information representing the risk ranking regarding the range in the vicinity of the current position of the user. First, the CPU 31 sends to the server 40 a risk ranking request including position information representing the range in the vicinity of the current position. Then, the CPU 31 acquires the risk ranking information sent from the server 40 as a response to the risk ranking request. It will be noted that the range in the vicinity of the current position is one or plural ranges including the range closest to the current position.

In step S108, the CPU 31 determines whether or not the risk ranking it has acquired is equal to or higher than the criterion Rth. The CPU 31 advances to step S110 in a case in which the risk ranking it has acquired is equal to or higher than the criterion Rth (step S108: YES). On the other hand, the CPU 31 ends the control process in a case in which the risk ranking it has acquired is less than the criterion Rth (step S108: NO).

In step S110, the CPU 31 causes the notification unit 38 to implement, using vibration and audio, the notification to return to the set route or the set area.

In step S112, the CPU 31 notifies the supervisor device 60 that the user has deviated from the set route or the set area and ends the control process.

Figure 9:
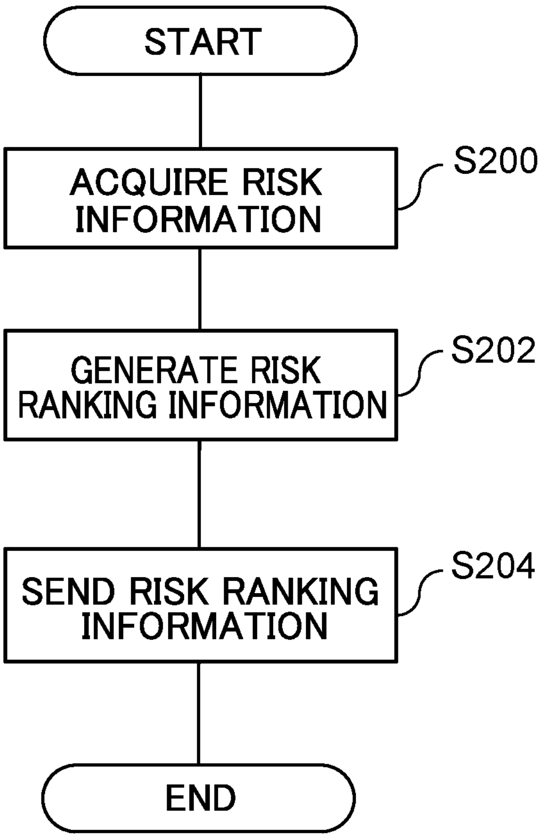
FIG. 9 is a flowchart showing the flow of a generation process pertaining to the embodiment.

Next, the flow of a process executed by the server 40 will be described. FIG. 9 is a flowchart showing the flow of a generation process for generating the risk ranking information executed by the server 40. The generation process is performed as a result of the CPU 41 reading the generation program 44A from the storage unit 44, loading it to the RAM 43, and executing it. As an example, the CPU 41 starts the generation process when it acquires the risk ranking request sent from the user device 20.

In step S200 shown in FIG. 9, the CPU 41 acquires from the storage unit 44 the risk information regarding the range represented by the position information included in the risk ranking request sent from the user device 20.

In step S202, the CPU 41 generates the risk ranking information based on the risk information acquired in step S200.

In step S204, the CPU 41 sends to the user device 20 the risk ranking information generated in step S202. Then, the CPU 41 ends the generation process.

As described above, in the user device 20, the CPU 31 acquires the current position of the user and, in a case in which the user has deviated from the set route or the set area, controls whether or not to cause the notification unit 38 to implement the return notification based on the risk ranking information. Because of this, in a case in which the user has deviated from the set route or the set area, whether or not to implement the notification to return to the set route or the set area can be controlled in consideration of concern with respect to the safety of the user.

Furthermore, in the user device 20, the CPU 31 causes the notification unit 38 to implement the return notification in a case in which the risk ranking is equal to or higher than the criterion Rth and does not cause the notification unit 38 to implement the return notification in a case in which the risk ranking is lower than the criterion Rth. Because of this, the user can be inhibited from heading to a place where concern with respect to safety are relatively high.

Furthermore, in the user device 20, the CPU 31 sets the criterion Rth based on the age of the user. Because of this, the safety of the user can be better ensured compared with a case where the age of the user is not considered.

Furthermore, in the user device 20, the CPU 31 sets the criterion Rth lower the lower is the age and sets the criterion Rth higher the higher is the age. Because of this, the safety of a user of a relatively young age can be better ensured.

Furthermore, in the user device 20, the CPU 31 notifies the supervisor of the user that the user has deviated from the set route or the set area in a case in which the risk ranking is equal to or higher than the criterion Rth and does not notify the supervisor of the user that the user has deviated from the set route or the set area in a case in which the risk ranking is lower than the criterion Rth. Because of this, the supervisor of the user can grasp that the user has deviated from the set route or the set area in a case in which the user is heading to a place where concerns with respect to safety are relatively high.

(Other)

In the above embodiment, the user device 20 is attached to the shoulder strap of a school backpack the user carries on his/her back, but the place where the user device 20 is attached is not limited. For example, the user device 20 may also be attached to the clothing and the body of the user. Furthermore, in a case in which the user device 20 is configured as a portable device such as a smartphone, the user device 20 may be stored in a pocket of the user's clothing.

In the above embodiment, the supervisor of the user is a parent, but the supervisor of the user is not limited. For example, the supervisor of the user may be another relative, such as an elder sibling and a grandparent, or may be a person other than a relative, such as a teacher at an elementary school and an instructor at an after-school childcare program.

In the above embodiment, the user is a lower elementary school child, but the age of the user is not limited. For example, the user may also be a preschooler, a higher elementary school child, a middle schooler, and a high schooler, and the user is not limited to being a child and may also be an elderly person.

In the above embodiment, the notification unit 38 implements the notification using vibration and audio, but the notification unit 38 is not limited to this and may implement the notification using either one of vibration or audio. Furthermore, the notification unit 38 may implement the notification using, in addition to vibration and audio, a monitor, in a case where the user device 20 is provided with a monitor.

In the above embodiment, the server 40 performs weighting so that the risk ranking represented by the risk ranking information becomes higher under predetermined conditions, but in addition to this, the server 40 may also perform weighting so that the risk ranking represented by the risk ranking information becomes lower under predetermined conditions. For example, the server 40, functioning as the generation section 41B, may also perform weighting so that the risk ranking represented by the risk ranking information becomes lower in a case where the difference between the age of a victim of an incident of concern and the age of the user is equal to or higher than a predetermined value. Furthermore, the server 40, functioning as the generation section 41B, may also perform weighting so that the risk ranking represented by the risk ranking information becomes lower in a case where the time of occurrence of a concern diverges a predetermined amount of time or more from the times when the user goes to and leaves school. Furthermore, the server 40, functioning as the generation section 41B, may also perform weighting so that the risk ranking represented by the risk ranking information becomes lower in a case where the weather conditions when an incident of concern occurred are different from the weather conditions on the school days of the user. Furthermore, the server 40, functioning as the generation section 41B, may also perform weighting so that the risk ranking represented by the risk ranking information becomes lower in a case where the suffering incurred by the victim of an incident of concern is mild.

In the above embodiment, the server 40 determines that the suffering incurred by the victim is bad in a case where the suffering incurred by the victim of a traffic accident is severe or fatal, but the determination details will differ depending on the type of the concern. For example, in a case where the concern acquired as the risk information is the sighting of a suspicious person, the server 40 determines that the suffering incurred by the victim is bad when the suffering incurred by the victim from the suspicious person is being approached by the suspicious person or an attempted kidnapping.

Furthermore, the user device 20 may acquire from the server 40 range information representing ranges on the set route or the set area promoting safety actions to the user and, in a case where the current position of the user is included in a range in the range information, cause the notification unit 38 to implement a predetermined notification. The safety actions include, as an example, checking actions for checking traffic safety and evacuation actions for evacuating from the current position. Furthermore, the ranges on the set route or the set area promoting safety actions include, as an example, checking ranges promoting checking actions and evacuation ranges promoting evacuation actions.

In this case, the server 40 acquires, from an external device, position information representing checking ranges in which traffic accidents have occurred in the past on the school route and evacuation ranges in which suspicious persons have been sighted in the past on the school route. At this time, a server computer owned by a predetermined business operator and data communication modules (DCMs) with which vehicles are equipped are applied for the external device. In a case where the external device is a DCM, the DCM sends vehicle driving data obtained from DCM data to the server 40. Then, the server 40 may extract, from the acquired vehicle driving data, position information representing checking ranges in which traffic accidents have occurred in the past and checking ranges in which dangerous driving events (e.g., stop sign violations and speeding) have occurred in the past and store the extracted position information as the range information in the storage unit 44. It will be noted that the user device 20 may also acquire the range information from the supervisor device 60.

It will be noted that the control process that the CPU 31 executed by reading software (a program) and the generation process that the CPU 41 executed by reading software (a program) in the above embodiment may also be executed by various types of processors other than a CPU. Examples of processors in this case comprise programmable logic devices (PLDs) whose circuit configuration can be changed after manufacture, such as field-programmable gate arrays (FPGAs), and dedicated electrical circuits that are processors having a circuit configuration dedicatedly designed for executing specific processes, such as application-specific integrated circuits (ASICs). Furthermore, the control process and the generation process may be executed by one of these various types of processors or may be executed by a combination of two or more processors of the same type or different types (e.g., plural FPGAs, and a combination of a CPU and an FPGA, etc.). Furthermore, the hardware structures of these various types of processors are more specifically electrical circuits in which circuit elements such as semiconductor elements are combined.

Furthermore, in the above embodiment, an aspect was described where the control program 34A was stored (installed) beforehand in the storage unit 34 and where the generation program 44A was stored (installed) beforehand in the storage unit 44, but they are not limited to this. The control program 34A and the generation program 44A may also be provided in a form in which they are recorded in a recording medium such as a compact disc read-only memory (CD-ROM), a digital versatile disc read-only memory (DVD-ROM), and a universal serial bus (USB) memory. Furthermore, the control program 34A and the generation program 44A may also take a form in which they are downloaded via the network N from an external device.

What is claimed is:

1. A user device, comprising a first processor, the first processor being configured to:

acquire a current position of a user;

determine whether the user is deviating from a set route based on the current position of the user;

upon determination that the user is deviating from the set route:

determine a value of a criterion based on an age of the user;

send a request for a risk ranking of the current position of the user to a server;

receive the risk ranking of the current position of the user from the server;

determine whether the risk ranking of the current position of the user is greater than or equal to the value of the criterion; and upon determination that the risk ranking of the current position of the user is greater than or equal to the value of the criterion:

notify the user to return to the set route; and notify a supervisor of the user that the user has deviated from the set route.

2. The user device of claim 1, wherein the first processor determines the value of the predetermined criterion that is lower, the lower the age is, and determines the value of the predetermined criterion that is higher, the higher the age is.

3. The user device of claim 1, wherein the first processor is configured to not notify the supervisor of the user that the user has deviated from the set route when the supervisor of the user and the user are together.

4. The user device of claim 1, wherein the first processor is configured to not notify the supervisor of the user that the user has deviated from the set route when a second user carrying the user device is together with the user.

5. The user device of claim 1, wherein the first processor is configured to notify the supervisor of the user that the user has deviated from the set route when the user has not returned to the set route after a predetermined amount of time has elapsed since the user was notified to return to the set route.

6. The user device of claim 1, wherein the first processor is configured to not notify the supervisor of the user that the user has deviated from the set route when the user has returned to the set route within a predetermined period of time after the user was notified to return to the set route.

7. The user device of claim 1, wherein the first processor is configured to determine the value of the predetermined criterion based on a number of times that the user has been notified to return to the set route in the past.

8. A safety education system, comprising the user device of claim 1 and a server, the server including a second processor configured to:

generate the risk ranking representing the ranking of concern with respect to the safety of the user carrying the user device, and send the generated risk ranking to the user device.

9. A control method, according to which a computer executes processing comprising:

acquiring a current position of a user;

determining whether the user is deviating from a set route based on the current position of the user;

upon determination that the user is deviating from the set route:

determining a value of a criterion based on an age of the user;

sending a request for a risk ranking of the current position of the user to a server;

receiving the risk ranking of the current position of the user from the server;

determining whether the risk ranking of the current position of the user is greater than or equal to the value of the criterion; and upon determination that the risk ranking of the current position of the user is greater than or equal to the value of the criterion:

notifying the user to return to the set route; and notifying a supervisor of the user that the user has deviated from the set route.

10. A non-transitory recording medium storing a control program executable by a computer to perform processing comprising:

acquiring a current position of a user determining whether the user is deviating from a set route based on the current position of the user;

upon determination that the user is deviating from the set route:

determining a value of a criterion based on an age of the user;

sending a request for a risk ranking of the current position of the user to a server;

receiving the risk ranking of the current position of the user from the server;

determining whether the risk ranking of the current position of the user is greater than or equal to the value of the criterion; and upon determination that the risk ranking of the current position of the user is greater than or equal to the value of the criterion:

notifying the user to return to the set route; and notifying a supervisor of the user that the user has deviated from the set route.

* * * * *